Figure 1:
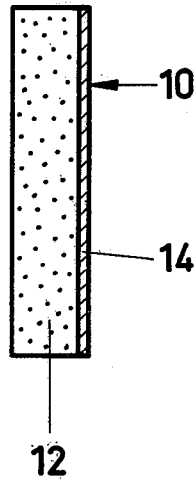

United States Patent [19]

Norling

[11] 4,163,173
[45] Jul. 31, 1979

[54] POROUS ELECTRODE BODY FOR ELECTRICAL ACCUMULATORS

[75] Inventor: Sten B. C. Norling, Oskarshamn, Sweden

[73] Assignee: Nife-Jungner AB, Oskarshamn, Sweden

[21] Appl. No.: 770,950

[22] Filed: Feb. 22, 1977

[30] Foreign Application Priority Data

Feb. 23, 1976 [SE] Sweden .............................. 20890/76

[51] Int. Cl.² .......................... H01J 1/02; H01J 1/14; H01J 1/48; H01K 1/04
[52] U.S. Cl. ................................. 313/352; 75/208 R; 75/222; 204/281; 204/283; 313/355
[58] Field of Search ....................... 313/352, 355, 356; 204/281, 283, 280; 75/208, 222

[56] References Cited

U.S. PATENT DOCUMENTS

| | | | |
|---|---|---|---|
| 2,928,783 | 3/1960 | Bacon | 204/283 |
| 3,186,871 | 6/1965 | Donohue | 75/208 R |
| 3,276,911 | 10/1966 | Schoeneweis | 204/283 X |
| 3,318,696 | 5/1967 | Krock et al. | 75/222 X |
| 3,318,794 | 5/1967 | Kiyohara et al. | 204/290 R |
| 3,385,780 | 5/1968 | I-Ming Feng | 204/290 R |
| 3,458,423 | 7/1969 | Csizi | 204/283 X |
| 3,655,535 | 4/1972 | Ruehlen et al. | 204/283 |
| 3,926,773 | 12/1975 | Koziol et al. | 204/290 R |
| 4,032,427 | 6/1977 | Kadija | 204/283 |

*Primary Examiner*—Saxfield Chatmon, Jr.
*Attorney, Agent, or Firm*—Burns, Doane, Sweeker & Mathis

[57] ABSTRACT

The invention relates to a porous body for electrical accumulators which body shows a new structure comprising at least two cohesive layers, at least one of which is a porous layer of sintered metal powder and at least one a thinner layer of solid metal produced by fusion and solidification of one of the external surfaces of the adjacent porous layer. The invention also relates to a method of manufacturing such an electrode body as well as to an electrical accumulator containing at least one such electrode body.

9 Claims, 3 Drawing Figures

POROUS ELECTRODE BODY FOR ELECTRICAL ACCUMULATORS

The present invention relates to a porous electrode body for electrical accumulators, to a method of manufacturing such an electrode body and to an electrical accumulator containing at least one such electrode body.

Porous electrode bodies for electrical accumulators have been manufactured for a long time now, from sintered metal powder. One known method of manufacturing sintered electrode bodies comprises placing a metal powder, for example carbonyl-nickel or carbonyl-iron powder, in a graphite mould and sintering the loosely packed powder in a furnace in a reducing atmosphere. Usually, a reinforcing element is embedded in the sintered body, for example in the form of a metal mesh, in order to increase the mechanical strength and improve the electrical conductivity.

Currently, sintered electrode bodies are also being manufactured using continuous processes. One such process comprises mixing a metal powder with a cellulose binder to form a slurry which is then dried, rolled and sintered in a furnace. In this way the cellulose is burnt off leaving behind pores in the body. Again, in this case, a metal mesh or other reinforcing element is required. Is is also possible to carry out the sintering operation with pore-forming agents, for example in the form of salts which, after the sintering operation, are leached out, and fibres of various kinds which undergo pyrolysis or are burnt off, during sintering.

Electrode bodies having different layers which are more or less dense sintered are also known, e.g. from U.S. Pat. No. 3,053,925 and U.S. Pat. No. 3,340,052. In addition to the fact that said electrode bodies have another structure than the electrode bodies according to the present invention, they are manufactured by complex methods.

It has also been proposed that porous electrode bodies should be manufactured by electrical resistance sintering of a metal powder between two electrodes having higher electrical conductivity than the pressed metal powder. This kind of resistance sintering can be carried out with the metal powder mass under very low pressure, something which is advantageous where the achievement of a good porosity in the sintered electrode body is concerned. This technique is disclosed in German Offenlegungsschrift No. 2,215,210, which, however, does not utilize electrodes having different thermal capacities. Thus, the sintering effect is uniform throughout the whole material.

A characteristic of the sintered electrode bodies hitherto employed is that they require some kind of embedded reinforcing element in order to impart to them adequate mechanical strength, or that the manufacturing processes normally comprise a plurality of stages which make manufacture more complex and expensive.

The porous electrode body forming the object of the present invention has good mechanical strength without the need to employ any extra reinforcing mesh or the like. Furthermore, the electrical conductivity of the electrode body and its current-delivering capacity are extraordinarily good. Moreover, the manufacture of the sintered electrode body can be performed in a single stage which makes it suitable for automated production.

These features are brought about by virtue of the fact that the electrode body contains at least two cohesive layers, at least one of which is a porous layer of sintered metal powder and at least one of which is a thinner layer of solid metal that is produced by fusion and solidification of the exterior surface of the adjacent porous layer.

The electrode body can be equipped with a conductive tag which is welded to at least one layer of solid metal. The solid metal layer then provides a good base for the weld which will preferably take the form of a spot-weld. Furthermore, this design establishes good electrical contact between the electode body and the tag and therefore provides effective delivery of current from the electrode body as well as supply of current to it when charging the accumulator in which the electrode body is incorporated.

Two electrode bodies each with a porous layer and a layer of solid metal can preferably be arranged to be welded together, for example by a spot-welding operation with the metal layers disposed towards each other and in electrical conductive contact with one another.

A preferable method of manufacturing a porous electrode body in accordance with the invention is to press a metal powder in a mould between two electrodes while passing an electric current through the powder, via the electrodes, until the powder is sintered together, the two electrodes according to the invention having mutually different thermal capacities. When the metal powder has sintered together, the pressure is reduced to a value close to zero Pascal units while the current continues to pass through the sintered metal powder. This is done in order to bring about fusing of the surface layer at that side of the electrode body disposed towards the electrode having the lower thermal capacity. Finally, the fused surface layer is allowed to solidify.

In order to obtain a layer of solid metal of the desired thickness, the mould pressure can be repeatedly increased and reduced while the current continues to pass through the sintered metal powder.

Figure 2:
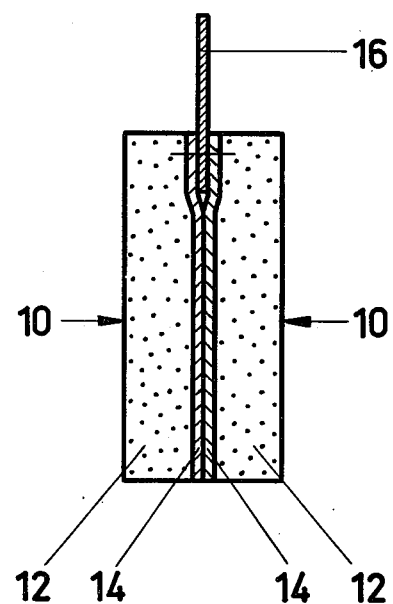
Figure 3:
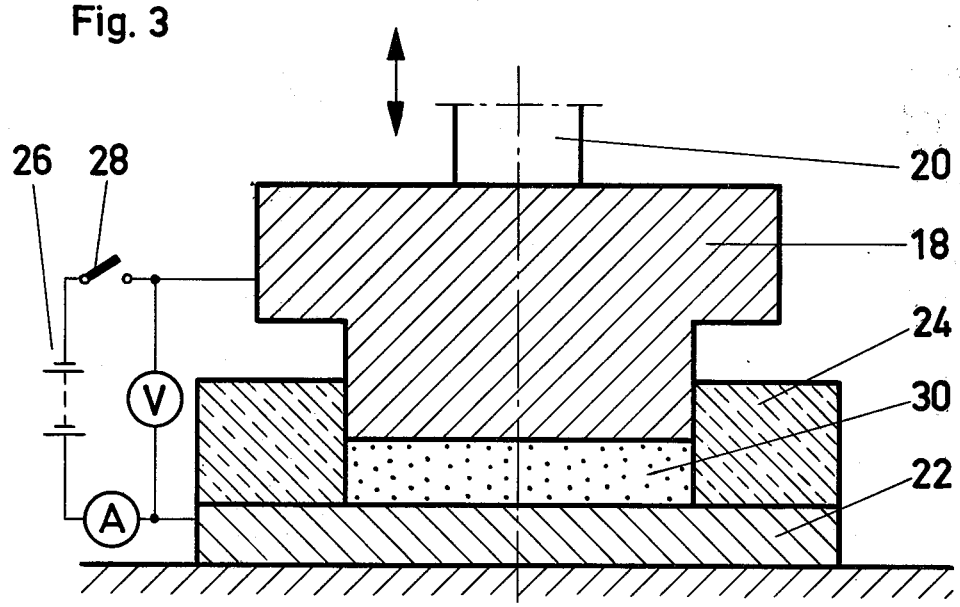

The invention will now be described in more detail making reference to the accompanying drawing, wherein FIG. 1 illustrates an electrode body in accordance with the invention, in cross-section;

FIG. 2 illustrates an alternative embodiment of an electrode body in accordance with the invention, in cross-section; and FIG. 3 schematically illustrates an apparatus for the manufacture of a porous electrode body in accordance with the invention.

FIG. 1 is a cross-sectional view through an electrode body 10 with a porous layer 12 and a solid layer 14 in accordance with the invention. The solid metal layer which has good mechanical strength, supports the electrode body and increases the electrical conductivity of the porous body. Since the metal layer 14 is constituted by part of the porous body, there is no tendency towards rupture or poor electrical contact, between the layers.

FIG. 2 illustrates a cross-section through an electrode body in accordance with the invention, in which two electrode bodies 10, each with a porous layer 12 and a solid metal layer 14, have been welded together with the solid metal layers 14 disposed towards each other. If required, a smallish part of the sintered layer 12 may be removed from the metal layer at some locations at the outer edges of the electrode body in order to provide more space for the welding operation which latter can be performed as a spot-weld. A conductive tag 16 of metal, for example sheet metal—is welded to the solid metal layers, for example in a spot-welding operation.

In the electrode body the pores in the porous section are fully open towards the surface which is disposed away from the contact surface towards a solid metal layer. In this way, the electrolyte in an electrical accumulator in which the electrode is used, has free access to the pore system of the electrode. Before being used in an electrical accumulator the electrode body is provided with an electro-chemically active material or the metal of the sintered part of the body is activated, in a manner known per se.

The electrode bodies in FIGS. 1 and 2 have been illustrated with predominantly flat, parallel and uniformly thick layers of porous and solid metal respectively but there is no reason why they should not have some other cross-sectional shape which could be produced by appropriate shaping of the press tool used in their manufacture. The solid metal layer 14 should, however, substantially be uniformly thick and should be kept as thin as possible in relation to the thickness of the porous layer. It is by this means that the lowest possible weight in relation to the capacity is obtained in the accumulator in which the electrode body is to be used. Normal thicknesses of the metal layer are 0.01–0.2 mm, with a total thickness of porous plus solid layers of about 0.5–5 mm.

The method of manufacture will be explained in more detail in relation to FIG. 3. Manufacture is carried out in a press mould having a top mould 18 equipped with a plunger shaft 20. It also includes a bottom mould 22 and a cavity 24 of electrically insulating material, for example soapstone or some other suitable ceramic material. Both the top mould 18 and the bottom mould 22 are made of an electrically conductive material, such as iron. The top mould 18 has a higher thermal capacity than the bottom mould 22 and in order to provide better heat dissipation during use, it may be equipped with a system of liquid or air cooling. A current source, indicated in the figure as an electrical battery 26, has one pole connected via a contact breaker 28 to the top mould 18, while its other pole is taken to the bottom mould 22. In order to control the manufacturing process an ammeter A will preferably be arranged in the circuit. A voltmeter V can also be connected across the terminals on top and bottom moulds respectively.

As a starting material for the manufacturing process, a finely divided metal powder, for example carbonyl-nickel, can be used. It is placed in the press cavity 24 as indicated at 30 in FIG. 3. A low pressure of from 0.05 to 1.0 Megapascals is applied to the metal powder 30. A suitable press will be a press of pneumatic or hydraulic kind equipped with pressure gauges. An electric current of from 100 to 1000 A/cm$^2$ is now passed through the metal powder via the top and bottom moulds 18, 22 which serve as electrodes. The powder mass located in the press mould has a high resistance at the low pressure applied and this means that great heat effects are liberated within the powder mass. The latter therefore rapidly sinters together and the sintering time is generally somewhere between 2 and 60 seconds. Because of the low pressure developed in the press, the powder mass maintains a high porosity on sintering. When the desired porosity has been reached in the sintered powder mass, the pressure is reduced until the top mould is just touching the powder mass. The pressure is then close to zero Pascal units. This results in a very substantially increased contact resistance between the powder mass and top and bottom moulds respectively. This means that the heat development in the contact surfaces between press moulds and the now sintered powder mass, rises rapidly. At the top mould, which has a high thermal capacity, the developed heat is transfered away from the contact surface towards the powder mass so that the melting temperature of the powder material is not reached. At the bottom mould on the other hand, the lower thermal capacity of the mould is insufficient to dissipate the heat equally quickly which means that the external surface of the sintered powder mass fuses.

The fused external surface of the sintered powder mass is then allowed to solidify. This can be done in a variety of ways.

If the top mould is raised from the powder mass to such an extent that contact with the latter ceases, then the current is automatically cut off and the heat development in the powder mass ceases at the same time. By heat delivery through the top and bottom moulds heat is dissipated from the sintered powder mass and the fused surface layer solidifies more or less instantaneously.

Similar conditions arise if the electrical circuit is opened by the contact breaker 28.

A preferred method of bringing about the solidification of the fused surface layer, is to reincrease the pressure developed by the press on the powder mass for a second or two before the current is disconnected. When the pressure is reincreased in this way, the contact resistance between the powder mass and the press mould is reduced and the fused surface layer solidifies at the same time that, through the pressure developed by the press, it is ridded of the small irregularities otherwise developing at the time of solidification. The powder body is hereby subjected to a post-sintering which seems to have an advantageous effect upon the contact between the porous and solid layers within the formed electrode body. Reduction of the pressure with renewed fusing and the production of a thicker layer of solid metal in the electrode body as a consequence, can then be carried out to the desired extent.

EXAMPLE

In a rectangular press mould with the dimensions 24×40 mm, 9.0 g of carbonyl-nickel powder with an average particle size of 2.6–3.4 um according to Fisher, were placed. The powder was pressed together by means of a pressure of 0.63 MPa. With the pressure maintained, a current with a current density of 840 A/cm$^2$ was passed through the powder. About 4 seconds after the switching in of the current, the pressure was reduced slowly during about 3 seconds to virtually zero MPa and then quickly raised again to the initial pressure of 0.63 MPa. As soon as the original pressure was regained, it was again reduced slowly during about 2 seconds to virtually 0 MPa and once more increased to the original level. A secondary sintering phase of 4 seconds followed, whereafter the current was disconnected. The final voltage across the sintered electrode body and the press moulds was 0.8 Volts which is equivalent to about 2.1 Volts per cm of thickness of the electrode body.

The porous electrode body obtained in this way had a porous layer of 75% porosity and a uniformly thin external layer of fused and solidified solid metal at one side. The total thickness of the body was 3.75 mm, the solid metal layer making up about 0.04 mm of this thickness.

What is claimed is:

1. A porous electrode body for electrical accumulators, which comprises at least two cohesive layers, at least one of which is a porous layer of sintered metal powder and at least one of which is a thinner layer of the same solid metal as that of the porous layer, which thinner layer is produced by fusion and solidification of one of the external surfaces of the adjacent porous layer.

2. A porous electrode body as claimed in claim 1, wherein a conductive tag is welded to at least one layer of solid metal.

3. An electrode body arrangement which comprises two electrode bodies as claimed in claim 1, each with a porous layer and a layer of solid metal and welded together with their metal layers facing each other and in electrically conductive contact with each other.

4. A method of manufacturing a porous electrode body for electrical accumulators, which comprises
    (a) pressing a metal powder in a mold between two electrodes while passing an electric current via the electrodes through the metal powder until the latter is sintered together, the two electrodes having mutually different thermal capacities;
    (b) reducing when the metal powder has sintered together, the pressure developed by the press to a value close to 0 Pascal with continued passing of the current through the sintered metal powder so as to fuse the surface layer at that side of the electrode body which is disposed towards the electrode with the lower thermal capacity; and
    (c) allowing the fused surface layer to solidify.

5. The method of claim 4, wherein the pressure developed by the press is increased and reduced repeatedly, with continued passing of the current through the sintered metal powder.

6. An electrical accumulator containing at least one of the porous electrode bodies of claim 1.

7. An electrode body arrangement which comprises two electrode bodies as claimed in claim 2, each with a porous layer and a layer of solid metal and welded together with their metal layers facing each other and in electrically conductive contact with each other.

8. An electrical accumulator containing at least one of the porous electrode bodies of claim 2.

9. An electrode accumulator containing at least one of the porous electrode bodies of claim 3.